United States Patent [19]

Chirhart et al.

[11] Patent Number: 4,919,741
[45] Date of Patent: Apr. 24, 1990

[54] METHOD FOR MAKING EMBOSSED INFORMATION PLATE HAVING RETROREFLECTIVE SHEETING ON THE SURFACE THEREOF

[75] Inventors: Dennis J. Chirhart, West St. Paul; Michael P. Daniels, Hastings; Kenneth G. Kneipp, Maplewood, all of Minn.

[73] Assignee: Minnesota Mining and Manufacturing Company, St. Paul, Minn.

[21] Appl. No.: 318,737

[22] Filed: Mar. 3, 1989

Related U.S. Application Data

[63] Continuation-in-part of Ser. No. 99,641, Sep. 23, 1987, abandoned, which is a continuation-in-part of Ser. No. 844,532, Jul. 11, 1986, abandoned.

[51] Int. Cl.$^5$ .............................. B31F 1/00; B32B 31/00
[52] U.S. Cl. ..................................... 156/223; 156/248; 156/267; 156/268; 264/163
[58] Field of Search ............... 156/219, 220, 221, 222, 156/223, 224, 247, 248, 260, 267, 268, 285, 327, 344, 582, 583.1, 488, 493; 101/23, 33, 35; 264/163, 285; 428/156, 187

[56] References Cited

U.S. PATENT DOCUMENTS

| | | | |
|---|---|---|---|
| 2,153,484 | 4/1939 | Schemmel | 156/221 |
| 2,438,089 | 3/1948 | Carson | 156/488 |
| 3,096,596 | 7/1963 | Magnuson et al. | 156/223 |
| 3,403,621 | 10/1968 | Simson et al. | 101/23 |
| 3,434,902 | 3/1969 | Bliss | 156/230 |
| 3,520,755 | 7/1970 | Scholl et al. | 156/223 |
| 3,553,045 | 1/1971 | Heh | 156/219 |
| 3,895,987 | 7/1975 | Loreck | 156/223 |
| 3,925,127 | 12/1975 | Yoshioka | 156/219 |
| 4,248,748 | 2/1981 | McGrath et al. | 428/497 |
| 4,289,559 | 9/1981 | Murphy | 156/582 |

FOREIGN PATENT DOCUMENTS 105643  4/1984  European Pat. Off. ............ 156/230

Primary Examiner—Robert A. Dawson
Assistant Examiner—Louis Falasco
Attorney, Agent, or Firm—Donald M. Sell; Walter N. Kirn; Robert H. Jordan

[57] ABSTRACT

A method for producing an embossed information plate, e.g., a license plate, wherein desired indicia are embossed in the front surface in relief form and retroreflective sheeting is adhered to the background portions of the front surface. A reflective sheeting having a low-tack, heat-activated adhesive on its backside is tacked to a plate blank. When the plate blank is embossed with desired indicia, the sheeting is simultaneously cut out according to the indicia. After the cut-out portions of the sheeting are removed, the embossed plate and trimmed sheeting which is tacked thereto are passed between a series of pairs of co-acting, resilient lamination rollers wherein the roller of each pair which contacts the sheeting is heated. The rollers conform to the contour of the indicia and heat the sheeting and adhesive, thereby causing the adhesive to effectively wet the surface of the plate and activating it as the sheeting is simultaneously laminated to the plate.

25 Claims, 3 Drawing Sheets

METHOD FOR MAKING EMBOSSED INFORMATION PLATE HAVING RETROREFLECTIVE SHEETING ON THE SURFACE THEREOF

RELATED APPLICATIONS

This is a continuation-in-part of application Ser. No. 099,641, filed Sept. 23, 1987, now abandoned, which was a continuation-in-part of application Ser. No. 844,532, filed July 11, 1986, now abandoned.

FIELD OF INVENTION

This invention relates to a method for making embossed information plates, e.g., license plates, having retroreflective sheeting on the surface thereof.

BACKGROUND

Traditionally, the indicia of license plates for motor vehicles have been incorporated into the plate by painting, stamping, embossing or the like. The starting product in the manufacture of license plates is customarily a plate or sheet blank of suitable thickness. This plate or sheet blank is typically made of metal, e.g., aluminum, or, more recently, of a suitable plastic material, e.g., acrylonitrile-butadiene-styrene ("ABS") copolymers, and is usually stamped or molded with a thickened rim or edge portion to provide greater rigidity. The plate manufacturer typically forms the desired indicia or markings by stamping the rear face of the blank so that the . indicia appear on the front face thereof in embossed fashion. The indicia, which are raised in relief relative to the background, are then typically colored with a different color than that of the background, such as by applying a colored coating to the raised area, e.g., by rollers.

Many countries use light reflecting, preferably retroreflective, license plates in order to improve recognition and reading of the identifying indicia, i.e., numerals and/or letters, on the plates at nighttime, and to increase traffic safety. When manufacturing such plates, a reflective material or substance is typically applied to the plate blank before the indicia are embossed therein. After embossing, the raised areas which constitute the indicia are covered or coated to provide contrast with the background. At nighttime and upon reflection, the coated indicia appear black whereas the reflective background, by contrast, appears bright and light-colored. The indicia coating is preferably chosen to provide daytime color contrast with the typically light-colored or white background.

It has been proposed that instead of coating raised areas with a colored coating material, that reflective material, such as retroreflective sheeting, be selectively applied only in the background areas of the plate around the raised indicia, with the indicia being provided by the exposed raised plate material. While such a technique avoids the previous practice of coating the raised areas of the plate with a special durable colored coating material, it has several difficulties. For example, selective application requires accurate trimming or pre-punching of the reflective sheeting to conform to the indicia, and accurate placement of the trimmed reflective sheeting in alignment with the indicia. Since the sheeting typically comprises a pressure-sensitive adhesive and is difficult to move after contacting the plate, accurate initial placement is demanded.

SUMMARY OF INVENTION

The present invention provides a method for producing an embossed information plate, such as a license plate, wherein desired indicia are embossed in the front surface in relief form and retroreflective sheeting is adhered to the background portions of the front surface of the plate.

Briefly summarizing, the novel method of the invention comprises, first, tacking a piece of reflective, preferably retroreflective, sheeting which has a layer of low-tack, heat-activated adhesive on the back side thereof to the front surface of a plate blank. The plate blank may have a thin, reinforcing rim along one or more of its sides for improved rigidity, but is essentially planar in the interior regions of its front surface. The reflective sheeting is typically trimmed to fit inside the boundaries of the reinforcing rim, if any, preferably covering substantially all of the interior region of the plate. The tack provided is sufficient to secure the sheeting to the plate throughout the subsequent fabrication steps but is low enough to permit removal of cut-out portions of the sheeting as described below.

Second, embossing the plate blank and reflective sheeting according to the outline of the desired indicia with a dual-die press, wherein a male die is pressed to the back surface of the plate blank, and a female die is pressed to the front surface of the plate blank upon which the sheeting is tacked. The female die is adapted to shear the sheeting according to the contours of the relief image of the indicia, thereby cutting-out the portions of the sheeting which cover the relief image.

Third, removing the cut-out portions of the reflective sheeting which cover the relief image and which are only lightly tacked thereto.

Fourth, moving the embossed plate and trimmed sheeting which is tacked thereto through a series of at least two pairs of co-acting, resilient lamination rollers. By co-acting it is meant that the rollers of each pair are simultaneously in contact with the plate on opposing sides thereof. The roller of each pair which contacts the front surface of the plate, or the reflective sheeting which is tacked thereto, may comprise internal heating means, or alternatively, such rollers may be heated by adjacent heating means. As the plate and tacked sheeting are moved between the rollers, the heated roller conforms to the contour of the indicia and heats the sheeting, which generally is at a level lower than the raised indicia, and adhesive on the backside of the sheeting, thereby causing the adhesive to effectively wet the surface of the plate and activating it as the sheeting is simultaneously laminated to the plate. Preferably a series of such co-acting roller pairs are provided and arranged so as to firmly support the plate during fabrication and to achieve a gradual, controllable rate of heating, thereby preventing even a thermoplastic plate from warping or distorting. Preferably, each roller has a substantially similar hardness as its co-acting roller, i.e., a Shore A hardness within ±20 durometer of the hardness of its co-acting roller.

According to the novel method of the invention, embossed information plates having desired indicia embossed on the front surface thereof with reflective sheeting adhered to the background portions of the front surface may be conveniently and accurately made from plastic materials such as acrylonitrile-butadiene-styrene copolymers. Accurate application of reflective sheeting to the background portions of the front surface of the plate is achieved and typically no overcoating of the relief indicia is necessary to provide color or reflective contrast between the indicia and background. With the novel method, such plates may even be made from thermoplastic materials having heat distortion temperatures relatively near the activation temperature for the adhesives used.

The present invention may be used to make embossed information plates used for many purposes such as identification plates, e.g., license plates for motor vehicles, or signs bearing directions or other information.

BRIEF DESCRIPTION OF DRAWING

In the accompanying drawing.

Figure 1:
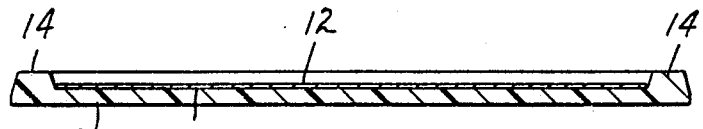
FIG. 1 is a cross-sectional view of a typical plate blank with reflective sheeting tacked to the front surface thereof.

These Figures are not to scale and are intended to be illustrative only.

DETAILED DESCRIPTION OF INVENTION

Because of lighter weight and reduced cost relative to metal-based constructions, identification plates such as license plates re more commonly being made from such plastic materials as acrylonitrile-butadiene-styrene copolymers ("ABS"). Other types of information plates, such as signs, may be made from plastic materials for similar reasons. For purposes of clarity, the following detailed description of the present invention is directed to making identification plates in accordance with the present invention. It will be understood, however, that information plates intended to be used for other purposes may be made in accordance with the present invention also.

Plate blanks, from which identification plates are typically fabricated, are formed such as by an injection molding process. A typical blank is about 4.5 inches (11.5 centimeters) wide, 18.5 inches (47.0 centimeters) long and between about 80 and 100 mils (2.0 and 2.5 millimeters) thick. Generally the blank is formed with thicker edges or a ridge along all four sides, i.e., a reinforcing rim about 125 mils (3.2 millimeters) thick and 250 mils (6.4 millimeters) wide, to impart greater strength and rigidity to the plate.

FIG. 1 shows in cross-section a typical plate blank 10 having a reflective sheet 12 tacked within the interior portions of the front surface thereof as defined by reinforcing rims 14. The retroreflective sheeting 12 has a layer 16 of low-tack, heat-activated adhesive on the back side thereof.

When used to make license plates, ABS, which is naturally hazy white in appearance, is typically pigmented with a desired color or black. Black pigments are preferred because they typically block polymer matrix-damaging ultraviolet radiation better than other pigments and typically tend to be more fade resistant than other pigments. Black also provides an effective color contrast between the indicia and the typically white or light-colored reflective background.

For identification plates such as license plates, the reflective sheeting 12 is typically preferably retroreflective to provide greater visibility. Such sheeting should have suitable durability and aging characteristics for the environment in which the identification plate is to be used. Suitable reflective sheetings 12 should be flexible enough that they do not crack during embossing or when the plate is flexed during use. However, sheetings used herein should not have such a high tensile elongation that they are stretched rather than cut during the embossing process as described below. We have found that sheetings having tensile elongations between about 5 and 35 percent are useful in this invention, with those having tensile elongations between about 10 and 25 percent being preferred. Examples thereof include acrylic-, urethane-, and polyester-based sheetings. Sheetings having high vinyl content may tend to stretch too much and to wrap around the relief-form indicia rather than to be cut during embossing, whereas sheetings having high alkyd content may tend to be too brittle and to crack during embossing.

Suitable adhesives include those which provide a desired degree of tack, as hereinafter described, at room temperature conditions, i.e., between about 60° F. (16° C.) and 80° F. (27° C.), and which can be activated, typically with heat, to provide a firm bond of the reflective sheeting to the embossed plate which will withstand conditions encountered in the environment in which the identification plate is to be used. For applications such as vehicle license plates, the adhesive bond which is provided should preferably withstand delamination forces due to wind, rain, etc., resist impact failure, maintain a firm bond throughout a temperature range of −40° F. (−40° C.) to at least about 150° F. (65° C.), and meet the criteria set forth in International Standards Organization specification 7591 for vehicle identification sheeting. In order to withstand the temperatures encountered in, e.g., a parking lot, the adhesive on a license plate made according to the invention should have a heat-activation temperature of at least 150° F. (66° C.), and preferably at least 160° F. (71° C.). Examples of suitable adhesives include acrylic-based compounds, such as the heat-activated adhesive comprising a pressure-sensitive-adhesive acrylate polymer and a tackifying resin which is disclosed in U.S. Pat. No. 4,248,748 (McGrath et al.).

In some embodiments a multilayer adhesive may be used. An example thereof is a two layer adhesive wherein the top layer which is in contact with the reflective sheeting is optimized for adhesion thereto and the bottom layer which is contacted to the plate blank is optimized for adhesion thereto, especially under the conditions, e.g., cold temperature, under which the resultant information plate is to be used. For instance, an acrylic-based adhesive may be used in the top layer to provide good adhesion to the sheeting and a rubber-based adhesive may be used in the bottom layer to provide good adhesion to the plate blank as well as high cold temperature shock or impact resistance. Such multilayer adhesives should provide sufficient interlayer adhesion to resist undesirable delamination. In such embodiments, the adhesive layer which is to be contacted to the plate blank should exhibit the desired rolling tack as described herein.

Desired room temperature tack is typically provided by adhesives which have "rolling tack" between about 2 and 20, preferably between about 5 and 10, centimeters as described herein. Rolling tack is determined by rolling a 0.25 inch (6.4 millimeter) steel ball down a 2.5 inch (6.4 centimeter) high ramp tilted to a 30° incline onto a level surface coated with the adhesive. The distance which the ball rolls along the adhesive coated surface is measured to provide the adhesive's rolling tack. The test is performed at room temperature, i.e., at 72° F. (22° C.). A similar method is taught in Pressure-Sensitive Tape Council Test Method PSTC-6, issued October, 1964, revised November, 1970. Sheetings having substantially less tacky adhesives may tend to slide around on the plate before the desired indicia have been embossed into the plate, or after embossing but before the sheeting is laminated thereto and the adhesive is heat-activated. Such sliding may interfere with proper alignment of, e.g., the trimmed sheeting and indicia. The cut-out portions of sheetings having substantially higher tack adhesives may tend to be harder to remove from the indicia. Any portions of the sheeting which overlap the indicia, e.g., trimmed sheeting which has slid from its initially tacked position or cut-out portions which have not been completely removed, may tend to interfere with the legibility thereof.

An identification plate is made by first tacking a piece of retroreflective sheeting 12 with low-tack, heat-activated adhesive 16 on its back side to the front surface of plate blank 10 with light pressure, e.g., with a rubber doctor blade or squeegee to provide the construction shown in FIG. 1. It will generally be convenient to trim sheeting 12 to fit within reinforcing rim 14 of blank 10, if one is provided, before tacking it to the blank.

Figure 2:
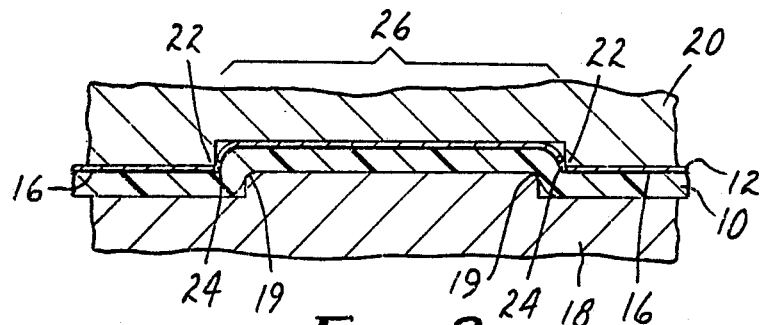
FIG. 2 is a cross-sectional view of a typical plate blank being embossed and the reflective sheeting tacked thereto being cut out according to the present invention.

Plate blank 10 is then embossed with a dual-die embossing press to emboss desired indicia 26, e.g., alphanumeric characters, and cut the retroreflective sheeting 12 as shown in FIG. 2. Male die 18 in the form of desired indicia 26 is pressed into the back side of blank 10 as female die 20 shaped to cooperate with the male die is pressed to the front surface of the blank upon which reflective sheeting 12 is tacked. Upper edges 19 of male die 18 are typically rounded. The female die is adapted with cutting edges 22 to cut-out 24 the sheeting along the relief outline of indicia 26.

Figure 3:
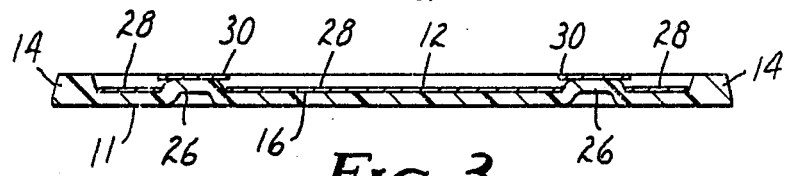
FIG. 3 is a cross-sectional view of the plate blank shown in FIG. 1 after the desired indicia have been embossed therein.

FIG. 3 shows a cross-section of embossed plate 11 and reflective sheeting 12. The background portions of the front surface of the plate are covered with trimmed sheeting 28 tacked thereto. Indicia 26 have cut-out portions 30 of the sheeting still tacked thereto.

Cut-out portions 30 of the sheeting are then removed to expose the underlying relief pattern of indicia 26. Cut-out portions 30 are removed such as with a transfer tape (not shown) or by contacting the sheeting with some adhesive or suction means (not shown) which adheres more strongly to sheeting 30 than does low-tack adhesive 16 to identification plate 11. Because cut-out portions 30 are on indicia 26 which is raised in relief, they are easily selectively contacted and removed without disturbing trimmed portions 28 of the sheeting which are tacked to the now relatively recessed background portions of the front surface of plate 11. Daytime visibility of identifying indicia 26 is provided by selecting sheeting 12 the color of which contrasts well with the pigmented color of license plate 11, e.g., a white sheeting and black plate. Nighttime visibility is provided by the contrasting reflectivity between the background and indicia. If desired, indicia 26 may subsequently be coated, i.e., painted with a desired contrast color.

Figure 4:
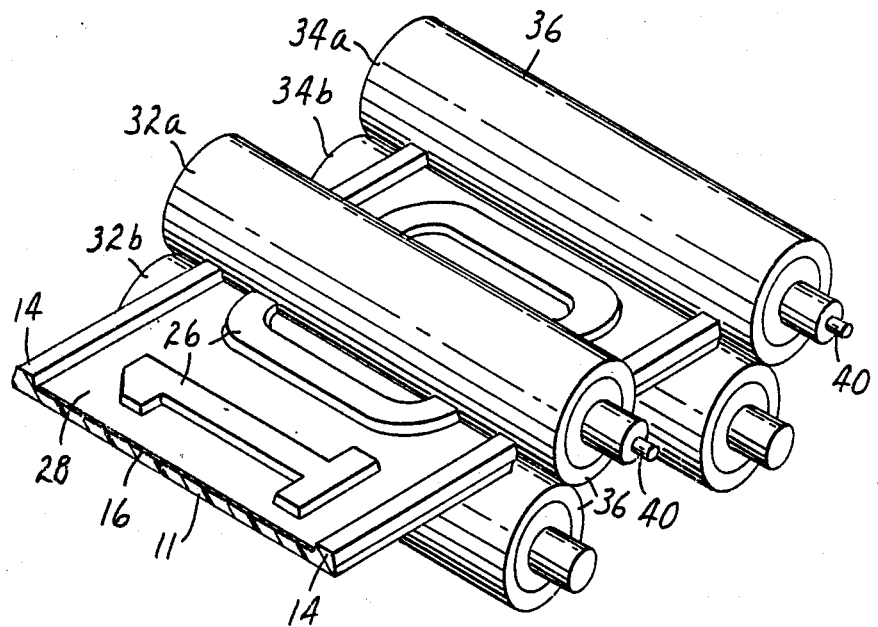
FIG. 4 is a perspective view showing a plate and with trimmed reflective sheeting tacked thereto being passed between two pairs of co-acting, resilient lamination rollers.

Embossed plate 11 with trimmed retroreflective sheeting 28 tacked thereto is then passed through a series of pairs of co-acting, resilient lamination rollers 32a,b, 34a,b, as shown in FIG. 4. The rollers are co-acting in that both rollers of a pair are aligned on an axis transverse to the path of movement of the plate so as to simultaneously contact opposite sides of the plate. While co-acting rollers need not have equal diameters, they should have equal surface speeds to avoid scuffing the plate and reflective sheeting or disturbing the position of the sheeting. This may be accomplished by, e.g., driving only the top roller of each co-acting pair and driving all such rollers at equal surface speeds, while permitting the bottom rollers to roll freely.

The lamination rollers 32a,b, 34a,b are resilient material, typically having a Shore A hardness of about 30 to 60 durometer, preferably between about 40 and 50 durometer. Each roller should be within 20 durometer of its co-acting roller. If the difference in hardness between two co-acting rollers is too great, the thermoplastic plate may tend to curl around the harder roller. Preferably the rollers will be within 10 durometer of each other, and ideally they will be within 5 durometer. Higher operating temperatures closer to the heat deformation point of the plate make it more important for any difference in hardness between co-acting lamination rollers to be small.

Figure 5:
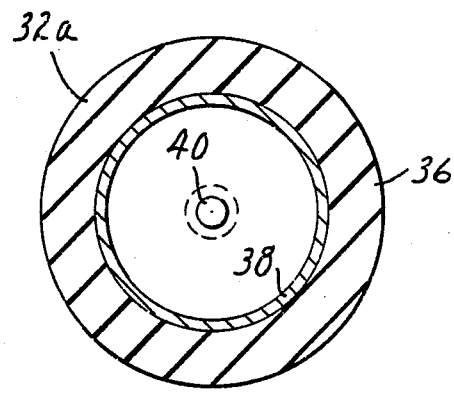
FIG. 5 is a cross-sectional view of a typical resilient lamination roller which comprises internal heating means according to the invention.

The roller of each pair 32a, 34a which contacts the front surface of embossed plate 11 and reflective sheeting 28 which is tacked thereto is heated. FIG. 5 shows a typical cross-section of such rollers. The outer surface of the roller is a cylindrically shaped layer 36 of resilient material having suitable hardness as discussed above. The resilient material is supported by rigid member 38, such as an aluminum or steel cylinder. The roller further comprises internal heating means 40, such as a resistance heating element or infrared lamp at the center of the roller or a heating web or blanket laminated to rigid member 38. Such heating means 40 preferably heats layer 36 uniformly around its circumference.

Figure 7:
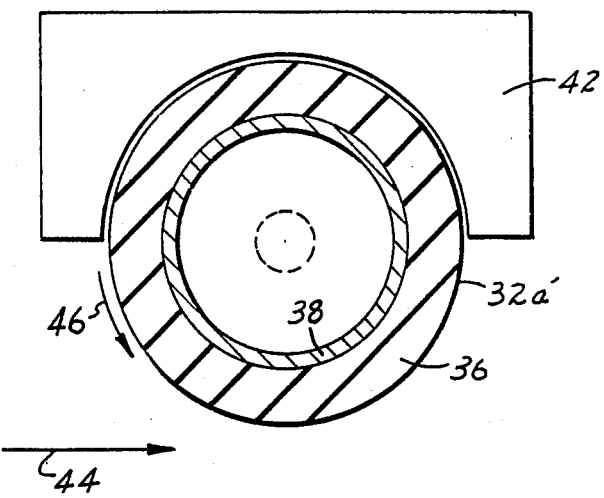
FIG. 7 is a cross-sectional view of another embodiment of resilient lamination roller and adjacent heating means.

Alternatively, the rollers which contact the front surface of the embossed plate may be heated by adjacent heating means instead of or in combination with internal heating means 40. Such a roller and adjacent heating means are illustrated in FIG. 7 wherein is shown roller 32a' comprising cylindrically shaped layer 36 of resilient material having suitable hardness and rigid member 38. Also shown in FIG. 7 is heating means 42, e.g., a radiant heating element, which is adjacent to lamination roller 32a'. Arrows 44 and 46 show the path of the information plate (not shown) and relative motion of roller 32a', respectively. As shown in the Figure, heating means 42 is shaped to provide more effective heating of roller 32a'.

A series of pairs of co-acting rollers provide the heat necessary to activate the adhesive as the trimmed sheeting is laminated to the plate by the resilient rollers which conform around the relief pattern of the indicia and provide sufficient pressure to cause the adhesive to effectively wet the surface of plate 11. Heated rollers 32a, 34a are preferably heated to a uniform temperature across the full portion of their length which is in contact with plate 11 to avoid warping it.

ABS has a heat-distortion temperature of about 200° F. (93° C.), i.e., at temperatures of 190° F. (88° C.) or more the plate blank is easily distorted and may tend to warp. Suitable adhesives will have a heat-activation temperature which is at least 160° F. (70° C.), and more typically is between about 165° F. (80° C.) and 190° F. (88° C.). Therefore care must be taken to fully support the plate as it is passed through the lamination rollers.

The number of pairs of co-acting rollers is determined in part by the length of the identification plate being made, with a greater number of co-acting rollers typically being necessary when longer identification plates are being made. At least two such pairs are required with up to twelve or more being useful. Enough pairs should be provided to support the plate and prevent it from warping as the sheeting is laminated thereto and the adhesive is activated. Typically, a sufficient number of rollers should be used to provide a residence time of about 20 to 40 seconds at the proper activation temperature, however, this will depend upon the adhesive used. The roller pairs may be spaced no further apart than the length of the plate, but closer spacing is generally preferred to ensure sufficient support to prevent warping or distortion of the plate and to minimize heat loss.

Figure 6:
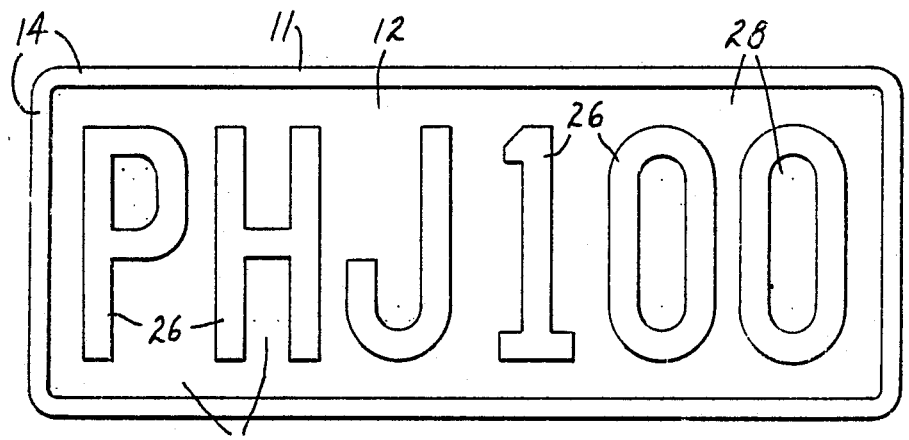
FIG. 6 is a plan view showing the final appearance of a typical license plate manufactured according to the present invention.

FIG. 6 is a plan view showing the final appearance of a typical vehicle license plate manufactured according to the present invention.

The present invention will be further explained in the following nonlimiting example.

EXAMPLE

Black-pigmented ABS was injection molded to form plate blanks about 4.5 inches (11.5 centimeters) wide, 18.5 inches (47.0 centimeters) long, and between 80 and 100 mils (2.0 and 2.5 millimetes) thick. The blanks had a reinforcing rim about 125 mils (3.2 millimeters) thick and 250 mils (6.4 millimeters) wide on all four sides surrounding an essentially planar interior.

An acrylic/urethane-based sheeting having a tensile elongation between about 15 and 25 percent was cut into strips of proper dimension to fit within the reinforcing rim covering essentially the entire planar interior. The sheeting had a tensile strength of about 12.5 pounds per inch-width (21.9 Newtons per centimeter-width), and was coated on the back side with a low-tack, heat-activated adhesive comprising an acrylate polymer and a phenolic tackifying resin such as is disclosed in U.S. Pat. No. 4,248,748. The adhesive had a rolling tack, as defined herein, of between about 5 and 10 centimeters. The sheet was tacked to plate blank with the pressure applied by a rubber-bladed squeegee. All materials were at room temperature, i.e., between about 66° F. (19° C.) and 72° F. (22° C.). The plate blank and sheeting were then embossed in a dual-die embossing station to form the desired indicia and cut out the reflective sheeting covering the indicia.

After embossing, the cut-out portions of the reflective sheeting were removed by means of an aggressively sticky tape which was lowered into contact with the cut-out portions of the sheeting then snapped back, thereby removing the same. The underlying blank ABS of the indicia was thus exposed while the trimmed reflective sheeting in the background areas remained firmly tacked thereto. Visual inspection revealed that the cut-out portions of the sheeting were completely removed as desired.

The plate and trimmed reflective sheeting were passed through four pairs of co-acting lamination rollers at a linear speed of about 2.5 feet (0.76 meter) per minute. The rollers each had a Shore A hardness of between about 35 and 45 durometer and a diameter of about 3.5 inches (8.9 centimeters). The vertical gap between co-acting rollers was about 2 to 3 millimeters, and pairs of co-acting rollers were spaced about 1 inch (2.5 centimeters) apart. The top rollers in each co-acting pair were driven at equal speeds and comprised internal heating elements to yield a surface temperature of between about 180° F. (82° C.) and 200° F. (93° C.). Temperature probes inserted into the adhesive layer revealed that, during lamination, the adhesive layer was heated to between about 160° F. (71° C.) and 180° F. (82° C.).

After lamination the plates were allowed to cool to room temperature. Visual inspection revealed that the reflective sheeting had been trimmed, and was securely bonded, accurately according to the outline of the indicia, indicating that it had remained firmly tacked to the ABS plate as desired. No portions of the cut-out sheeting which had originally covered the indicia remained. The strength of the bond of the trimmed sheeting to the ABS plate was examined by directing a high pressure stream of hot water 176° F. (80° C.) at the laminate at pressures up to 2000 pounds per square inch ($1.48 \times 10^7$ Newtons per square meter), eventually causing the sheeting to begin to break up and erode. No apparent failure of the adhesive bond to the ABS plate was evident.

Various modifications and alterations of this invention will become apparent to those skilled in the art without departing from the scope and spirit of this invention.

What is claimed is:

1. A method for producing an information plate having desired indicia embossed on the front surface thereof in relief fashion and having a reflective sheeting adhered to the background portions of said front surface, wherein said method comprises:
   (1) tacking a reflective sheeting comprising a low-tack, heat-activated adhesive on the back side thereof to the front surface of a plate blank, the surface of said plate blank being essentially planar in the interior regions thereof;
   (2) embossing said plate blank and reflective sheet according to said indicia with a dual-die press, wherein a male die is pressed to the back surface of said blank, and a female die is pressed to the front surface of said blank upon which said reflective sheeting is tacked, said female die being adapted to shear said reflective sheet along the contours of said indicia, whereby said reflective sheeting is cut out along the relief outline of said indicia;
   (3) removing the cut-out portions of said reflective sheeting from said indicia; and
   (4) moving said embossed plate and the trimmed reflective sheeting which is tacked thereto through a series of at least two pairs of co-acting, resilient lamination rollers, wherein the roller of each pair which contacts the front surface of said plate is heated with heating means, whereby said adhesive is activated and effectively wets the surface of said plate and said reflective sheeting is laminated to the front surface of said plate.

2. The method of claim 1 wherein said reflective sheeting is retroreflective.

3. The method of claim 1 wherein said plate blank comprises a reinforcing rim.

4. The method of claim 1 wherein said adhesive is acrylic-based.

5. The method of claim 4 wherein said adhesive comprises an acrylic polymeric component that provides pressure-sensitive adhesive properties, and a tackifying resin component which reduces room temperature pressure-sensitive adhesiveness but leaves the adhesive with heat-activatable adhesive properties.

6. The method of claim 1 wherein said adhesive has a rolling tack of between about 2 and 20 centimeters.

7. The method of claim 6 wherein said adhesive has a rolling tack of between about 5 and 10 centimeters.

8. The method of claim 1 wherein said cut-out portions of said reflective sheeting are removed with adhesive means, wherein the adherence of said adhesive means to said cut-out portions exceeds the tack to said plate provided by said low-tack, heat-activated adhesive on said reflective sheeting.

9. The method of claim 1 wherein said cut-out portions of said reflective sheeting are removed with suction means.

10. The method of claim 1 wherein from three to twelve pairs of said co-acting rollers are provided.

11. The method of claim 1 wherein said lamination rollers have a Shore A hardness of between about 30 and 60 durometer.

12. The method of claim 11 wherein said lamination rollers have a Shore A hardness of between about 40 and 50 durometer.

13. The method of claim 1 wherein the hardness of each said roller is within 20 durometer of its co-acting roller.

14. The method of claim 13 wherein the hardness of each said roller is within 10 durometer of its co-acting roller.

15. The method of claim 14 wherein the hardness of each said roller is within 5 durometer of its co-acting roller.

16. The method of claim 1 wherein said lamination rollers each comprise:
   (1) a rigid member having an essentially cylindrical outer profile; and
   (2) a resilient material on the outer surface thereof, said resilient material having an essentially uniform thickness and conforming to the outer profile of said rigid member, said resilient material being at least as thick as the depth of said indicia.

17. The method of claim 16 wherein said plate blank comprises a reinforcing rim and said resilient material is at least as thick as said reinforcing rim.

18. The method of claim 1 wherein said heating means comprises at least one of the following: heating means internal to the roller and heating means adjacent to the roller.

19. The method of claim 1 wherein said heating means comprises at least one of the following: an infrared lamp, a resistance heating element, and a radiant heating element.

20. The method of claim 1 wherein said adhesive is heated to between about 150° F. and 200° F.

21. The method of claim 1 wherein:
   (1) said reflective sheeting is retroreflective;
   (2) said plate blank comprises a reinforcing rim;
   (3) said adhesive comprises an acrylic polymeric component that provides pressure-sensitive adhesive properties, and a tackifying resin component which reduces room temperature pressure-sensitive adhesiveness but leaves the adhesive with heat-activatable adhesive properties, said adhesive having a rolling tack of between about 2 and 20 centimeters;
   (4) said cut-out portions of said reflective sheeting are removed with adhesive means;
   (5) from three to twelve pairs of said co-acting rollers are provided, said rollers each comprising:
      (a) a rigid member having an essentially cylindrical outer profile; and
      (b) a resilient material on the outer surface thereof, said resilient material having an essentially uniform thickness and conforming to the outer profile of said rigid member, and being at least as thick as the depth of said indicia, wherein the hardness of said resilient material is between about 30 and 60 durometer and is within 10 durometer of the resilient material on the co-acting roller; and
   (6) said adhesive is heated to between about 150° F. and 200° F.

22. The method of claim 1 wherein said information plate is a license plate.

23. A method for producing an identification plate having desired indicia embossed on the front surface thereof in relief fashion and having a reflective sheeting adhered to the background portions of said front surface, wherein said method comprises:
   (1) tacking a reflective sheeting comprising a low-tack, heat-activated adhesive on the back side thereof to the front surface of a plate blank, the surface of said plate blank being essentially planar in the interior regions thereof;
   (2) embossing said plate blank and reflective sheet according to said indicia with a dual-die press, wherein a male die is pressed to the back surface of said blank, and a female die is pressed to the front surface of said blank upon which said reflective sheeting is tacked, said female die being adapted to shear said reflective sheet along the contours of said indicia, whereby said reflective sheeting is cut out along the relief outline of said indicia;
   (3) removing the cut-out portions of said reflective sheeting from said indicia; and
   (4) moving said embossed plate and the trimmed reflective sheeting which is tacked thereto through a series of at least two pairs of co-acting, resilient lamination rollers, wherein the roller of each pair which contacts the front surface of said plate is heated with heating means, whereby said adhesive is activated and effectively wets the surface of said plate and said reflective sheeting is laminated to the front surface of said plate.

24. The method of claim 1 wherein said adhesive comprises a top layer and a bottom layer, said bottom layer being contacted to said front surface of said plate blank.

25. The method of claim 24 wherein said top layer comprises an acrylic-based adhesive and said bottom layer comprises a rubber-based adhesive.

* * * * *

UNITED STATES PATENT AND TRADEMARK OFFICE
CERTIFICATE OF CORRECTION

PATENT NO. : 4,919,741
DATED : April 24, 1990
INVENTOR(S) : Dennis J. Chirhart, et al.

It is certified that error appears in the above-identified patent and that said Letters Patent is hereby corrected as shown below:

In Column 1, line 32, delete the period following the first word "the".

In Column 3, line 44, "re" should read --are--.

Signed and Sealed this

Eighth Day of October, 1991

Attest:

HARRY F. MANBECK, JR.

Attesting Officer

Commissioner of Patents and Trademarks